(12) United States Patent
Dieckmann

(10) Patent No.: US 12,194,997 B2
(45) Date of Patent: Jan. 14, 2025

(54) METHOD FOR CONTROLLING A VEHICLE AND DISTANCE REGULATION CONTROL DEVICE

(71) Applicant: ZF CV Systems Global GmbH, Bern (CH)

(72) Inventor: Thomas Dieckmann, Pattensen (DE)

(73) Assignee: ZF CV SYSTEMS GLOBAL GMBH, Bern (CH)

(*) Notice: Subject to any disclaimer, the term of this patent is extended or adjusted under 35 U.S.C. 154(b) by 351 days.

(21) Appl. No.: 17/773,624

(22) PCT Filed: Nov. 2, 2020

(86) PCT No.: PCT/EP2020/080628
§ 371 (c)(1),
(2) Date: May 2, 2022

(87) PCT Pub. No.: WO2021/089453
PCT Pub. Date: May 14, 2021

(65) Prior Publication Data
US 2022/0379887 A1 Dec. 1, 2022

(30) Foreign Application Priority Data
Nov. 8, 2019 (DE) ...................... 10 2019 130 201.3

(51) Int. Cl.
*B60W 30/16* (2020.01)
*B60W 10/18* (2012.01)
(Continued)

(52) U.S. Cl.
CPC ............ *B60W 30/16* (2013.01); *B60W 10/18* (2013.01); *B60W 40/04* (2013.01); *B60W 40/08* (2013.01);
(Continued)

(58) Field of Classification Search
None
See application file for complete search history.

(56) References Cited

U.S. PATENT DOCUMENTS 8,606,455 B2 * 12/2013 Boehringer ........... B60W 30/17
701/23
11,318,940 B2 5/2022 Broll et al.
(Continued)

FOREIGN PATENT DOCUMENTS

DE 102009039774 A1 3/2011
DE 102012212339 A1 1/2014
(Continued)

OTHER PUBLICATIONS

Makishita, Hiroshi et al. "Differences of drivers' reaction times according to age and mental workload," 2008, Elsevier, Accident Analysis and Prevention 40 (2008), pp. 567-575 (Year: 2008).*

*Primary Examiner* — Aniss Chad
*Assistant Examiner* — Madison R. Inserra
(74) *Attorney, Agent, or Firm* — Leydig, Voit & Mayer, Ltd.

(57) ABSTRACT

A method for controlling a subject vehicle with a braking system, a drive system and a distance control system, wherein the distance control system is configured to control an actual following distance between the subject vehicle and a vehicle ahead to a predetermined target following distance, wherein the target following distance is predetermined as a function of an activated operating mode of the distance control system, including performing a plausibility check by checking whether V2X data is exchanged or can be exchanged between the vehicle ahead and the subject vehicle over a V2X connection, and activating, if no V2X data is exchanged or can be exchanged between the vehicle ahead and the subject vehicle over the V2X connection, a
(Continued)

first operating mode in which a first target following distance is predetermined as a function of a reaction time of a driver of the subject vehicle.

19 Claims, 2 Drawing Sheets

(51) Int. Cl.
| | | |
|---|---|---|
| *B60W 40/04* | (2006.01) | |
| *B60W 40/08* | (2012.01) | |
| *B60W 50/16* | (2020.01) | |
| *G08G 1/00* | (2006.01) | |
| *H04W 4/46* | (2018.01) | |
| *B60W 30/165* | (2020.01) | |
| *B60W 50/14* | (2020.01) | |

(52) U.S. Cl.
CPC ............... *B60W 50/16* (2013.01); *G08G 1/22* (2013.01); *H04W 4/46* (2018.02); *B60W 2420/403* (2013.01); *B60W 2420/408* (2024.01); *B60W 2540/10* (2013.01); *B60W 2540/12* (2013.01); *B60W 2540/229* (2020.02); *B60W 2554/4041* (2020.02); *B60W 2554/80* (2020.02); *B60W 2556/65* (2020.02)

(56) References Cited

U.S. PATENT DOCUMENTS

| | | | |
|---|---|---|---|
| 2010/0256835 | A1 | 10/2010 | Mudalige |
| 2016/0332624 | A1* | 11/2016 | Tezuka ................. B60W 30/16 |
| 2017/0344023 | A1 | 11/2017 | Laubinger et al. |
| 2019/0184993 | A1* | 6/2019 | Wigard ................. B60W 30/16 |
| 2020/0130689 | A1 | 4/2020 | Hanslik et al. |
| 2020/0207371 | A1* | 7/2020 | Dougherty ............... G08G 1/22 |
| 2020/0346667 | A1* | 11/2020 | Kanoh ................ B60W 30/165 |
| 2021/0031767 | A1* | 2/2021 | Kim ..................... B60W 50/14 |
| 2021/0162999 | A1* | 6/2021 | Lucas ................... B60W 40/08 |
| 2021/0163000 | A1 | 6/2021 | Dieckmann et al. |

FOREIGN PATENT DOCUMENTS

| | | | |
|---|---|---|---|
| DE | 102015203804 | A1 | 9/2016 |
| DE | 102015211117 | A1 * | 12/2016 |
| DE | 112016001612 | T5 | 1/2018 |
| DE | 102016011325 | A1 | 3/2018 |
| DE | 102018000620 | A1 | 7/2018 |
| DE | 102017004741 | A1 | 11/2018 |
| DE | 102018109235 | A1 | 10/2019 |
| JP | 2008110620 | A | 5/2008 |
| JP | 2010117771 | A | 5/2010 |
| KR | 20150075762 | A | 7/2015 |
| SE | 1650608 | A | 2/2017 |
| WO | WO 2014003630 | A1 | 1/2014 |
| WO | WO 2017035516 | A1 | 3/2017 |
| WO | WO 2018054518 | A1 | 3/2018 |

* cited by examiner

METHOD FOR CONTROLLING A VEHICLE AND DISTANCE REGULATION CONTROL DEVICE

CROSS REFERENCE TO RELATED APPLICATIONS

This application is a U.S. National Phase application under 35 U.S.C. § 371 of International Application No. PCT/EP2020/080628, filed on Nov. 2, 2020, and claims benefit to German Patent Application No. DE 10 2019 130 201.3, filed on Nov. 8, 2019. The International Application was published in German on May 14, 2021 as WO 2021/089453 A1 under PCT Article 21(2).

FIELD

The invention relates to a method for controlling a vehicle and a distance control device.

BACKGROUND

In vehicles, in particular commercial vehicles, a distance control system—traditionally also referred to as adaptive cruise control (ACC)—is used, with which a predetermined first target following distance between a subject vehicle and a vehicle directly ahead can be set. For this purpose, a certain subject vehicle target acceleration or a subject vehicle target speed is predetermined by a distance control device of the distance control system and this subject vehicle target acceleration or subject vehicle target speed is set up by means of a braking system and/or a drive system of the subject vehicle in order to control the predetermined first target distance.

The distance control device accesses and processes the environment signals of an environment detection system arranged in the subject vehicle, in particular a radar sensor or lidar sensor, to adjust the vehicle target acceleration or subject vehicle target speed to environment signals of an environment detection signal arranged in the subject vehicle in order to include current driving dynamics information relating to the vehicle environment, for example a current actual following distance to the respective vehicle ahead, as a controlled variable of the distance control system.

In order to determine the first target following distance as the control variable of the distance control system, a minimum safety distance is normally set which takes into account at least the reaction time of the driver and the braking capacity of the vehicles involved. In addition, a choice of the driver, for example "short", "medium", "long" can be included. The reaction time is used to determine a first target following distance, at which the driver still has a chance to brake the vehicle in good time, for example in the event of emergency braking of the vehicle ahead. This reaction time can be determined, for example, according to the so-called Milner model.

For the driving mode in a platoon in which two or more vehicles move in a coordinated manner in a convoy, a central coordinator is traditionally provided, who is located in one of the vehicles of the platoon and, for example, determines the position and the actual following distances of the individual vehicles depending on driving dynamics parameters, such as braking capacity, vehicle weight and so on, and distributes these to the individual vehicles. The communication between the central coordinator and the individual vehicles takes place via a wireless V2X connection (V2X, vehicle-to-everything). This serves the coordination of the vehicles with each other and the transmission of driving dynamics information, so that the vehicles of the platoon can react automatically to each other more quickly.

Accordingly, in a platoon, the latency time for transmitting V2X data via the V2X connection is particularly relevant for a coordinated and safe setting of the driving dynamics of the individual vehicles. Since the latency time is usually shorter than the reaction time of the driver, the vehicles of the platoon can drive at a shorter actual distance from each other, whereby in particular the slipstream can be exploited for a fuel-saving driving style without neglecting the safety aspect.

By way of example, such platooning of vehicles is described in JP 2008110620 A2, JP 2010117771 A2, WO 2017/035516 A1, DE 10 2012 212 339 A1. In KR 20150075762 A, light communication between unmanned vehicles of a platoon is also described.

In SE 1650608 A, environment data from an environment detection system are used to check whether a vehicle ahead is suitable for forming a platoon based on its dimensions. Thereupon, certain target following distances are specified which must be observed between the vehicles.

DE 10 2017 004 741 A1, using the distance control system of a subject vehicle via a corresponding interface to set a target following distance predetermined for platooning is described. Also in WO 2018/054518 A1, using the distance control system for setting the target following distance, in particular as a function of the braking capacity of the vehicle, is described.

SUMMARY

In an embodiment, the present disclosure provides a method for controlling a subject vehicle with a braking system, a drive system and a distance control system, wherein the distance control system is configured to control an actual following distance between the subject vehicle and a vehicle ahead to a predetermined target following distance, wherein the target following distance is predetermined as a function of an activated operating mode of the distance control system, comprising performing a plausibility check by checking whether V2X data is exchanged or can be exchanged between the vehicle ahead and the subject vehicle over a V2X connection, and activating, if no V2X data is exchanged or can be exchanged between the vehicle ahead and the subject vehicle over the V2X connection, a first operating mode in which a first target following distance is predetermined as a function of a reaction time of a driver of the subject vehicle.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

DETAILED DESCRIPTION

Figure 1:
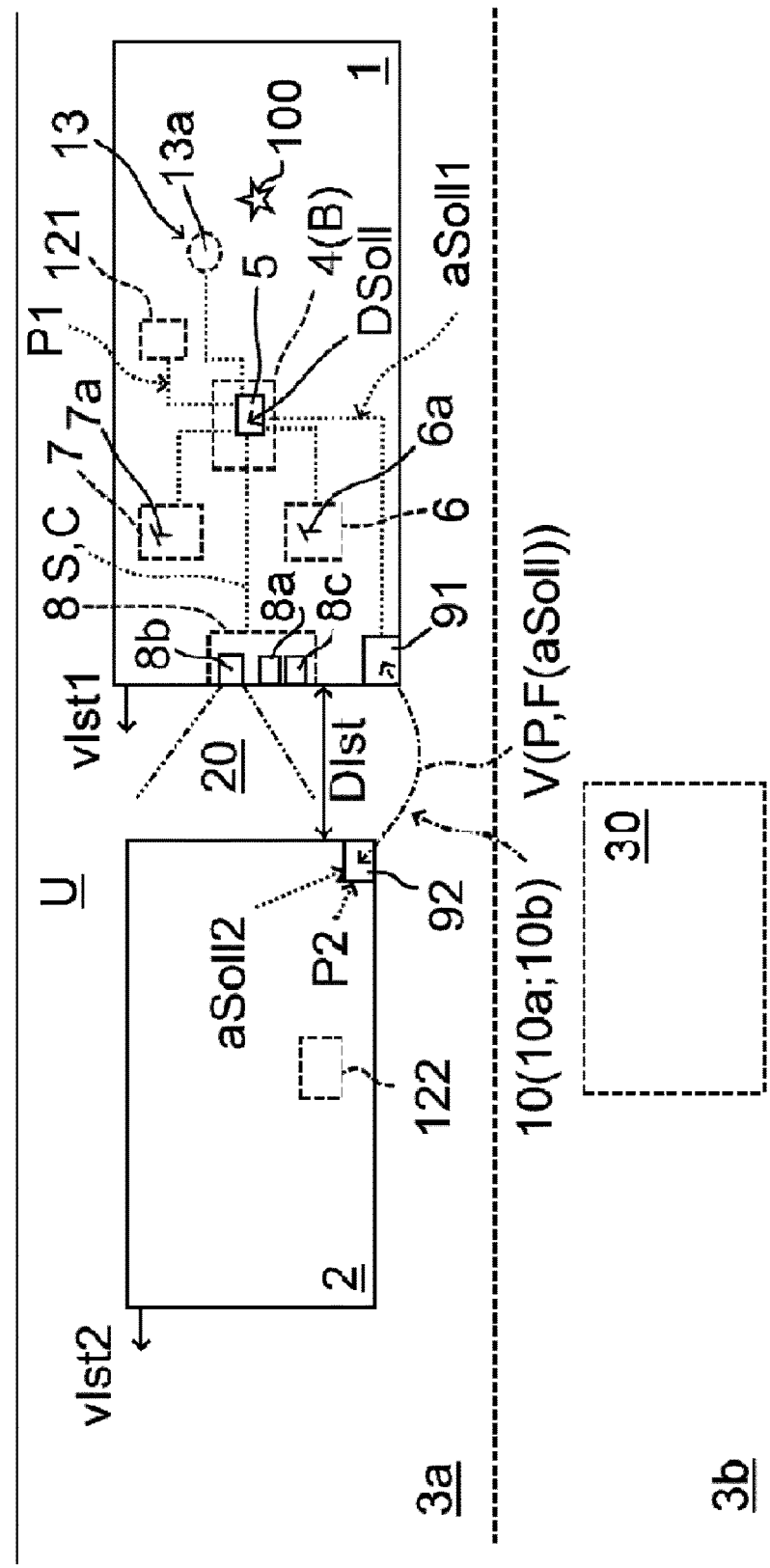
Figure 2:
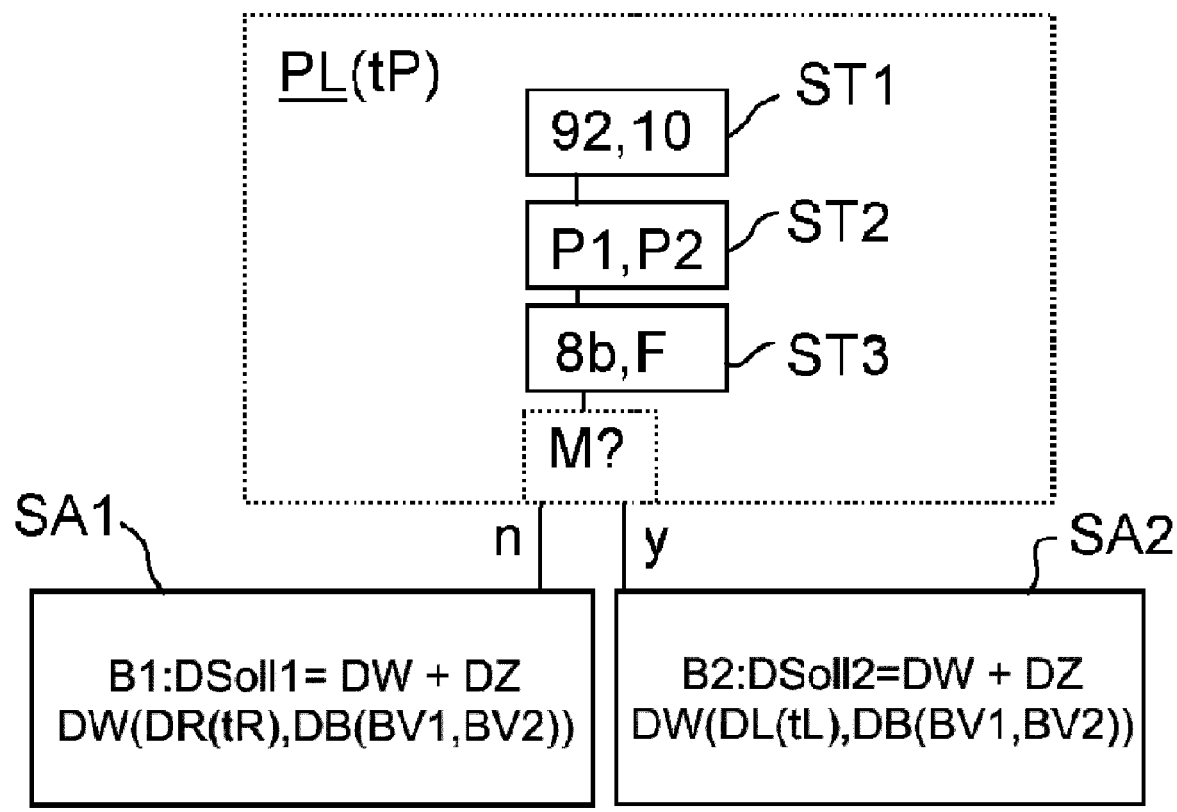

FIG. 1 shows a driving situation with a subject vehicle and a vehicle ahead; and FIG. 2 shows a flowchart of the method according to the invention. In an embodiment, the present invention specifies a method, a distance control device and a subject vehicle which enable coordinated travel of at least two vehicles in a convoy in a simple and reliable manner.

In an embodiment, a method for controlling a subject vehicle with a braking system, a drive system and a distance control system is provided, wherein the distance control system is designed to control an actual following distance between the subject vehicle and a vehicle driving ahead to a predetermined target following distance, wherein the target following distance is predetermined as a function of an activated driving mode of the distance control system, wherein
- in an activated first operating mode, a first target following distance is predetermined as a function of a reaction time of a driver of the subject vehicle, and
- in an activated second operating mode, a second target following distance is predetermined independently of the reaction time of the driver of the subject vehicle, wherein in order to activate the second operating mode, in a plausibility checking step it is checked whether V2X data are or can be exchanged safely and reliably between the vehicle ahead and the subject vehicle via a V2X connection.

Advantageously, without the use of a central coordinator or a lead vehicle, a second operating mode of the distance control system can be activated, in which a second target following distance is defined as the control variable, in which the reaction time of the driver is no longer taken into account, which is therefore preferably shorter than a first target following distance. As a result, the two vehicles can move in a convoy mode at shorter actual following distances, which are set by the distance control system as the controlled variable.

In order to ensure safe travel, the second operating mode with the second target following distance is only activated or permitted if it is plausibly established that a V2X connection (V2X, vehicle-to-everything) is established between the vehicles. In this case, driving dynamics information, which is relevant for the control of the vehicle, for example in the event of emergency braking, can be exchanged via this fast transmission path and the reaction time of the driver can preferably be disregarded when determining and setting the actual following distance, since this is no longer necessarily or is only necessary as redundancy for a rapid intervention. This shortens the possible actual following distance and allows fuel-saving driving to take place in a convoy mode. A similar effect with this is that the first target following distance is predetermined as a function of a fraction or a percentage of the reaction time of the driver. This is equivalent to the fact that the actual reaction time of the driver is not taken into account when predetermining the target following distance.

It is preferably provided that the first operating mode is automatically activated if no V2X data is or can be exchanged safely and reliably between the vehicle ahead and the subject vehicle via a V2X connection. Accordingly, it is assumed that the fast data transmission of the driving dynamics information via the V2X connection is not reliably possible, so that in this case no faster control of the subject vehicle is possible and the reaction time of the driver becomes relevant again in order to react to emergency braking, for example.

It is preferably provided that for the activation of the second operating mode it is further checked whether the vehicle ahead is in the same lane as the subject vehicle, preferably by comparing a global vehicle ahead position with a global subject vehicle position, wherein the global vehicle ahead position is derived from the V2X data transmitted via the V2X connection. Advantageously, after the establishment of a V2X connection, it is additionally checked or plausibility checked whether the vehicle ahead is relevant for the distance control process at all, i.e. is in the same lane. For this purpose, the global position information assigned to the vehicle ahead, which is transmitted via the V2X connection anyway and is available in the subject vehicle, is also used for a comparison, so that a simple check is made possible.

It is preferably provided that in order to activate the second operating mode, it is further checked in the plausibility check step whether the actual following distance between the subject vehicle and the vehicle ahead remains approximately the same. This makes it easy to check the plausibility of whether the subject vehicle is moving at a roughly constant distance from the vehicle ahead. Thus, it is highly likely that the intention can be derived that the driver of the subject vehicle wants to drive in the slipstream and also the vehicle ahead does not counteract this, for example by leaving the same lane. In this way, further information can be used to plausibly determine whether both vehicles, and in particular the subject vehicle, want to drive in a convoy without the need for a central coordinator or a lead vehicle.

It is preferably provided that in order to activate the second operating mode, it is further checked in the plausibility check step whether the vehicle ahead is in a field of view of a camera of the subject vehicle and it is recognized on the basis of camera data of the camera whether the vehicle ahead is driving in the same lane as the subject vehicle. Advantageously, therefore, the information of a camera can still be used for plausibility checking in order to check whether there is a vehicle ahead which is relevant for the distance control process.

It may be provided that in order to activate the second operating mode in the plausibility check step, a check is carried out as to
- whether driving dynamics information transmitted via the V2X connection, for example a vehicle ahead target deceleration and/or a vehicle ahead actual speed and/or a related variable, matches the camera data output by the camera, and/or
- whether the actual following distance determined by the distance control system can be derived from the camera data determined by the camera.

Thus, in addition, a plausibility check of different sources of information can take place, wherein the actual following distance can be derived, for example, via a radar sensor and/or lidar sensor of the environment detection system and via the camera data from the camera of the environment detection system. The two can be checked for agreement in order to determine whether a convoy mode is highly likely to be desired and thus whether the activation of the second operating mode of the distance control system makes sense or is appropriate.

Preferably, it is also provided that the plausibility check step for activating the second operating mode is carried out over a plausibility check period. Accordingly, the described checks are carried out as part of the plausibility check step over a certain period of time in order to exclude disturbances or short-term vehicles ahead, for example vehicles crossing the lane are not recognized as vehicles with which driving in a convoy is desired.

Preferably, therefore, it is provided that the second operating mode is activated if in the plausibility check step, which has the sub steps just described, it is plausibly determined that the vehicles intend or above all the subject vehicle intends to drive relative to each other in a convoy mode at an actual following distance without taking into account the reaction time. If, therefore, it is determined in the steps described in each case that, for example, the vehicle ahead is driving in the same lane during the plausibility check period, which can follow for example, from the global positions and/or the camera data as described above, and a V2X connection is reliably established over the plausibility check period, the second operating mode is activated and the second target following distance is set. If there are doubts from one of the sub steps of the plausibility check step that a convoy mode between the vehicles is desired or useful, the second mode is preferably not activated because it cannot be safely or plausibly determined whether the reaction time may not be taken into account.

Preferably, a reaction time of between 0.8 s and 1.5 s is specified as the reaction time for determining the first target following distance, wherein the reaction time can be determined, for example, according to the Milner model known to those skilled in the art.

Preferably, it is also provided that the first target following distance takes into account a minimum safety distance, which takes into account at least a reaction distance and preferably also a braking safety distance based on the braking capacity of the vehicles involved, and the second target following distance takes into account the minimum safety distance, which takes into account at least one latency distance and preferably also the braking safety distance based on the braking capacity of the vehicles concerned and does not take into account the reaction distance, wherein the reaction distance is determined from the reaction time, taking into account the current actual speed of the subject vehicle, and the latency distance is determined from a plausibility time, taking into account the current actual speed of the subject vehicle, wherein the latency time indicates the time to transmit the V2X data between the subject vehicle and the vehicle ahead via the V2X connection.

Accordingly, depending on the operating mode, the relevant time, i.e. the reaction time or the latency time, which has an effect on the target following distance, is used so that the driver, or the subject vehicle automatically, can react adequately to a braking situation of the vehicle ahead, preferably an emergency braking situation, without causing a rear-end collision. Since the latency time is usually shorter than the reaction time of the driver, the second target following distance is correspondingly shorter, so that fuel-saving driving in the convoy mode can be guaranteed.

In addition, it may be provided that the first target following distance follows from a sum of the minimum safety distance, at least taking into account the reaction distance, and an additional distance selected by the driver; and the second target following distance follows from a sum of the minimum safety distance, at least taking into account the latency distance and without taking into account the reaction distance, and an additional distance selected by the driver. Thus, the respective target distance can be determined in a simple calculation step, wherein a selection of a driver can also be taken into account, for example according to a subdivision into "short", "medium", "long". Thus, the driver can choose an additional distance which is suitable in the current driving situation, which is then added to the respective minimum safety distance in the respective operating mode.

Furthermore, it may be provided that the first target following distance is compared with the second target following distance and/or the reaction time is compared with the latency time, and when the second operating mode is activated, the second target following distance is equal to the first target following distance if it is determined that the second target following distance is greater than the first target following distance and/or the latency time is greater than the reaction time of the driver. Alternatively in this case, the first operating mode can also be activated automatically, since if the latency time is too long, it can be concluded that the V2X data are not or cannot be transmitted securely and reliably over the V2X connection. If, according to one of the alternatives, the first target following distance is returned to, this is preferably communicated to the driver optically and/or acoustically and/or haptically.

Advantageously, as a result, even when activating the second operating mode, the shorter target distance can be used if, in the case of long latency times and thus an unreliable V2X connection, the driver would actually intervene earlier with his reaction time than would be the case automatically with the driving dynamics information transmitted via the V2X data. This means that a safe actual following distance can still be controlled.

Preferably, it is also provided that the plausibility check step is allowed only when an activation device is activated, wherein the activation device is, for example, a switch arranged in the subject vehicle, which can be activated temporarily or permanently by the driver. Accordingly, the driver can decide for himself whether the activation of the second operating mode or a shorter actual following distance should take place without taking into account the reaction time.

Furthermore, it is provided that when the activation device is deactivated, the first operating mode is automatically activated or maintained. As a result, it can be actively determined when to switch to the first operating mode or the normal distance control.

Preferably, it is also provided that the driver can deactivate the second operating mode, for example by operating a brake pedal and/or an accelerator pedal. This means that the driver can deactivate the second operating mode even without deactivating the activation device, as with normal distance controls, by actively intervening in the driving dynamics. It is preferably provided that due to deactivating the second operating mode by the driver, the distance control system is deactivated or the first operating mode is activated. The distance control is thus completely placed back in the driver's hands or carried out again as normal depending on the reaction time.

In an embodiment, a distance control device is also provided in a subject vehicle, in particular for carrying out a method according to the invention, wherein the distance control device is designed to control an actual following distance between the subject vehicle and a vehicle ahead to a predetermined target following distance, preferably using the environment detection system in the subject vehicle, in particular a radar sensor and/or a lidar sensor, as well as a drive system and a braking system in the subject vehicle for accelerating or decelerating the subject vehicle, wherein the target following distance can be predetermined depending on an operating mode of the distance control system which can be activated by the distance control device, wherein
    in a first operating mode which can be activated by the distance control device, a first target following distance can be predetermined as a function of a reaction time of a driver of the subject vehicle, and
    in a second operating mode which can be activated by the distance control device, a second target following distance can be predetermined regardless of the reaction time of the driver of the subject vehicle,
wherein, in order to activate the second operating mode it can be checked by the distance control device in a plausibility check step whether V2X data can be exchanged between the vehicle ahead and the subject vehicle via a V2X connection.

Particularly advantageous compared to the previously known platooning concepts is the fact that the approach described above can be used to build up convoys of vehicles of any length without the need for a central coordinator or a lead vehicle. This significantly increases the efficiency compared to two-element platoons, as guide vehicles are no longer required.

A subject vehicle with a distance control system having a distance control device according to an embodiment of the invention is also in accordance with the invention.

In FIG. 1, a subject vehicle 1 is shown schematically which is moving at an actual following distance DIst from a vehicle ahead 2 on a road 3 with two lanes 3a, 3b. The subject vehicle 1 has a distance control system 4 with a distance control device 5, which serves to control the actual following distance DIst to a target following distance DSoll. For this purpose, the distance control device 5 is designed to control a braking system 6 and/or a drive system 7 of the subject vehicle 1 in order to specifically adjust the actual following distance DIst by decelerating or accelerating the subject vehicle 1.

To detect the actual following distance DIst, the distance control device 5 uses an environment detection system 8 in the subject vehicle 1, wherein the environment detection system 8 generates environment signals S, which characterize a vehicle environment U. In its simplest form, the environment detection system 8 can comprise a radar sensor 8a and/or a lidar sensor 8c, for example. This makes it possible, for example, to determine the current actual following distance DIst to the vehicle ahead 2 from the signal S, which is used as a controlled variable for the distance control in the distance control system 4.

The subject vehicle 1 also has a subject vehicle V2X module 91 (V2X; vehicle-to-everything), which is designed to communicate via a wireless V2X connection 10 with objects in the vehicle environment U, which also have such a V2X module 92, 93. The V2X connection 10 is a short-range data connection, for example WLAN 10a, DSRC (Dedicated Short Range Communication) 10b, etc. According to the embodiment shown, for example, the vehicle ahead 2 has a vehicle ahead V2X module 92, so that V2X data V can be exchanged wirelessly between the two vehicles 1, 2 via a V2X connection 10 which is formed therewith.

The V2X data V can, for example, contain a global position P, for example determined by a global satellite navigation system (GNSS; Global Navigation(al) Satellite System), for example GPS, Differential GPS (DGPS), Galileo, GLONASS, etc., of the respective vehicle 1, 2 and/or motion information or driving dynamics information F of the respective vehicle 1, 2, for example a vehicle target deceleration aSoll or a related variable. In addition, an infrastructure device 11 may also have an infrastructure device V2X module 93 to enable an exchange of V2X data V. To determine the global position P, a position detection device 121, 122 is provided in the subject vehicle 1 and in the vehicle ahead 2.

On the basis of the V2X data V, the subject vehicle 1 can match its driving dynamics to the vehicle ahead 2, which according to an embodiment of the invention is used to set the actual following distance DIst to a shorter distance than usual and thus to drive in a kind of convoy mode M. Thus, use is made of the fact that coordinated vehicles 1, 2 can set a shorter actual following distance DIst in order to make better use of the slipstream in particular and thus to be able to drive more economically or fuel-efficiently without an increased safety risk due to the shorter actual following distance. The vehicles 1, 2 are therefore moving in a convoy.

The distance control system 4 is used in two operating modes B; B1, B2, which can be set or activated situationally via the distance control device 5:

In a first operating mode B1, which corresponds to a normal distance control, for example a minimum safety distance DW to the vehicle ahead 2 is first determined. In addition, an additional distance DZ can be selected by the driver 100, which can be done, for example, in the form of a rough subdivision, for example "short", "medium", "long". The distance control device 5 then automatically controls the subject vehicle 1 with the determined actual following distance DIst as the controlled variable to a first target following distance DSoll1 as the control variable by means of the braking system 6 and/or the drive system 7.

The first target following distance DSoll1 results from the specified minimum safety distance DW, taking into account at least one reaction distance DR and a braking safety distance DB, which takes into account a braking capacity BV1, BV2 of the participating vehicles 1, 2, and the driver's desired additional distance DZ. The first target following distance DSoll1 then follows, for example, from the sum DR+DB (BV1, BV2)+DZ ("short", "medium", "long"). In particular, possibly existing variances in the braking capacity BV1, BV2 of the participating vehicles 1, 2 can be included by means of the braking safety distance DB.

Accordingly, in the first operating mode B1 of the distance control system 4 during the determination of the minimum safety distance DW, a certain reaction time tR of the driver is taken into account, so that the subject vehicle 1, for example in the event of emergency braking of the vehicle ahead 2, can still brake in a timely manner, i.e. with no or minimal collision consequences (rear-end collision). This reaction time tR corresponds, depending on the current actual vehicle speed vIst1, to a certain reaction distance DR, which is included in the first target following distance DSoll1, which is controlled to in the first operating mode B1.

In a second operating mode B2 (following mode), a second target following distance DSoll2 is specified as the control variable, wherein this does not take into account the reaction distance DR. Instead, a latency distance DL can be taken into account, so that the second target following distance DSoll2 for the second operating mode B2 results from the specified minimum safety distance DW, taking into account at least the latency distance DL and the braking safety distance DB, which takes into account a braking capacity BV1, BV2 of the participating vehicles 1, 2, and the driver's desired additional distance DZ. The second target following distance DSoll2 then follows, for example, from the sum DL+DB (BV1, BV2)+DZ ("short", "medium", "long"). Taking into account the current actual speed VIst1, the latency distance DL results from a latency time tL, which is required for the transmission of the V2X data V between the vehicles 1, 2 via the V2X connection 10.

In the second operating mode B2, it is assumed that the subject vehicle 1 is matched to the vehicle ahead 2 via the V2X connection 10. In an emergency braking situation or even a general braking situation, it is no longer the reaction time tR of the driver which is decisive for the initiation of (emergency) braking, but the latency time tL for transmitting the global position P or the driving dynamics information F, i.e. in particular the vehicle ahead target deceleration atarget2 in an (emergency) braking situation, from the vehicle ahead 2 to the subject vehicle 1. On the basis of this vehicle ahead target deceleration atarget2, the subject vehicle 1 can then automatically initiate (emergency) braking with a corresponding vehicle target deceleration aSoll1.

Since the latency time tL is usually shorter than the reaction time tR, the second target following distance DSoll2 is usually shorter than the first target following distance DSoll1. The latency times tL of the V2X connection 10 are usually in the range of 30 ms to 300 ms, whereas the reaction times tR are between 800 ms and 1500 ms. In the second operating mode B2, shorter actual following distances DIst between the vehicles 1, 2 can therefore be set due to the coordination of the two vehicles 1, 2 via the V2X communication 10, without compromising safety compared to the first operating mode B1.

Under certain circumstances, the distance control device 5 can constantly check whether the following applies: DSoll2<DSoll1 or tL<tR, so that in the case of exceptionally long latency times tL—even in the second operating mode B2—the driver and thus the reaction time tR or the first target following distance DSoll1 is given preference if this is shorter than the second target following distance DSo112. In this case, the second target following distance DSoll2 can be set to the first target following distance DSoll1 in the second operating mode B2, or—synonymous with this—the latency time tL can be set to the reaction time tR or the first operating mode B1 can be activated. In this case, the driver must be warned visually via a display and/or acoustically via an acoustic signal and/or haptically via the steering wheel.

In order to activate the second operating mode B2 with a preferably reduced second target following distance DSo112, a plausibility check step PL is carried out in advance according to FIG. 2, in which it is determined whether the subject vehicle 1 is following a vehicle ahead 2 and both vehicles 1, 2, especially the subject vehicle 1, intend or intends with high probability to drive in a convoy mode M, i.e. with an actual following distance DIst, without taking into account the reaction time tR or the reaction distance DR. On the basis of the driving situation of the two vehicles 1, 2, it is therefore plausibility checked whether a convoy mode M makes sense or is appropriate for the following subject vehicle 1.

This can be done, for example, by first determining in a first sub step ST1 whether the vehicle ahead 2 has a vehicle ahead V2X module 92 at all or whether a V2X connection 10 to the vehicle ahead 2 can be established, so that it is not the reaction time tR but the latency time tL which becomes relevant as described above. This can be done, for example, by the fact that the subject vehicle V2X module 91 is constantly monitored by the distance control device 5 for incoming V2X data V. However, the existence of or the possibility of establishing a V2X connection 10 can also be checked in advance.

In a subsequent second sub step ST2, it is checked whether the incoming V2X data V actually originate from a vehicle ahead 2, which is located in the same lane 3*a* as the subject vehicle 1. As a result, it can be ruled out that V2X data V are being received from an adjacent vehicle 30 in the adjacent lane 3*b*, relative to which no target following distance DSoll is to be controlled and with which no travel in a convoy is to take place.

This check in the second sub step ST2 can be carried out on the basis of the global vehicle ahead position P2 transmitted via the V2X data V. If the global vehicle ahead position P2 in coordination with the global subject vehicle position P1 indicates that the vehicle ahead 2 is in the same lane 3*a* as the subject vehicle 1, this can be considered as an indicator that both vehicles 1, 2 are highly likely to intend to drive in a platooning mode M with an actual following distance DIst without taking into account the reaction time tR or the reaction distance DR.

Furthermore, on the basis of the driving dynamics information F transmitted via the V2X connection 10, for example the vehicle ahead target deceleration aSoll2 and/or a vehicle ahead actual speed vIst2 and/or a related variable, it can be checked whether the direction of travel of the two vehicles 1, 2 coincides. In addition, it can be checked whether the actual following distance DIst between the two vehicles 1, 2 remains approximately the same over a certain period of time.

In addition, in a third sub step ST3, further components of the environment detection system 8 in the subject vehicle 1 can be used, for example a camera 8*b*, which is oriented with its field of view 20 to the vehicle environment U. On the basis of the camera data C of the camera 8*b*, for example, it can be determined whether a vehicle ahead 1 is in the field of view 20 of the camera 8*b* and a vehicle ahead 1 is also driving in the same lane 3*a* as the subject vehicle 1. From this it can also be plausibly concluded whether the two vehicles 1, 2, in particular the subject vehicle 1, intend with a high probability to drive in a convoy mode M with an actual following distance DIst without taking into account the reaction time tR or the reaction distance DR. In addition, the driving dynamics information F transmitted via the V2X connection 10, for example the vehicle ahead target deceleration aSoll2 and/or a vehicle ahead actual speed vIst2 and/or a related variable, can be compared with the camera data C or thus plausibility checked. In addition, it can also be checked whether the actual following distance DIst determined by the radar sensor 8*a* and/or the lidar sensor 8*c* matches the vehicle ahead 2 determined with the camera 8*b*, for example by triangulation when using a stereo camera.

Further information available in the subject vehicle 1 can also be used, from which it can be estimated that the two vehicles 1, 2 are highly likely to wish to move in a coordinated manner at shorter actual following distances DIst from each other on the same lane 3*a* in a convoy mode M.

In order to carry out a plausibility check, it is envisaged that the plausibility check step PL or the individual sub steps ST1, ST2, ST3 . . . as part of the plausibility check step PL are each carried out over a certain plausibility check period tP in order to avoid disturbing influences and thus ensure that a convoy mode M is appropriate.

If it is determined in the individual sub steps ST1, ST2, ST3 or in the plausibility check step PL as described that the vehicles 1, 2 should drive in a coordinated manner at short actual following distances DIst without consideration of the reaction time tR of the driver with high probability (convoy mode M), according to FIG. 2 the activation of the second operating mode B2 described above is allowed by the distance control device 5 in a second activation step SA2. However, if it is found that such coordinated driving is not appropriate because, for example, the individual sub steps ST1, ST2, ST3 indicate that no vehicle ahead 2 is present in the same lane 3a or that no V2X connection 10 can be established over the plausibility check period tR, etc., the first operating mode B1 is activated in a first activation step SA1.

Compared to the state of the art, the subject vehicle 1 determines or plausibility checks independently whether coordinated driving in a convoy or at short actual following distances DIst is reasonable or appropriate. This is done without recourse to a central coordinator in one of vehicles 1, 2. The respective subject vehicle 1 thus decides independently whether to enter a convoy by a previously plausibility-checked activation of the second operating mode B2.

The plausibility check is usually carried out automatically if the driver so wishes or an activation device 13 is activated. For example, the driver can activate a switch 13a as an activation device 13 temporarily or permanently, by which the plausibility check step PL with individual sub steps ST1, ST2, ST3 is temporarily or permanently permitted in the respective situations. If the switch 13a is deactivated, on the other hand, the first operating mode B1 is always retained, as the driver does not want to drive in a convoy.

Furthermore, it may be provided that the driver actively deactivates the second operating mode B2 by a certain action, for example deactivating the switch 13a or depressing the brake pedal 6a and/or the accelerator pedal 7a, whereby either the distance control is canceled altogether or initially the first operating mode B1 is activated automatically.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

1 Subject vehicle
2 Vehicle ahead
3 Road
3a Lane of the subject vehicle 1
3b Adjacent Lane
4 Distance control system
5 Distance control device
6 Braking system of the subject vehicle
6a Brake pedal
7 Drive system of the subject vehicle
7a Accelerator pedal
8 Environment detection system
8a Radar sensor
8b Camera
8c Lidar sensor
91 Subject vehicle V2X module
92 Vehicle ahead V2X module
93 Infrastructure device V2X module
10 V2X connection
10a WLAN
10b DSRC
11 Infrastructure device
121 Subject vehicle position detection device
122 Vehicle ahead position detection device
13 Activation device
13a Switch
20 Field of view of the camera 8b
30 Adjacent vehicle
100 Driver
aSoll Vehicle target deceleration
aSoll1 Subject vehicle target deceleration
aSoll2 Vehicle ahead target deceleration
B Operating modes of the distance control system 4
B1 First operating mode
B2 Second operating mode
BV1 Braking capacity of the subject vehicle 1
BV2 Braking capacity of the vehicle ahead 2
C Camera data
DB Braking safety distance
DIst Actual following distance
DL Latency distance
DR Reaction distance
DZ Additional distance
DSoll Target following distance
DSoll1 First target following distance
DSoll2 Second target following distance
DW Minimum safety distance
F Driving dynamics information
M Convoy mode
P Global position
P1 Global subject vehicle position
P2 Global vehicle ahead position
PL Plausibility check step
S Environment signals
tL Latency time
tP Plausibility check period
tR Reaction time of the driver
U Vehicle environment
V V2X data
vIst1 Subject vehicle actual speed
vIst2 Vehicle ahead actual speed
SA1 First activation step
SA2 Second activation step
ST1, ST2, ST3 Sub steps of the plausibility check step PL

The invention claimed is:

1. A method for controlling a subject vehicle with a braking system, a drive system and a distance control system, wherein the distance control system is configured to control an actual following distance between the subject vehicle and a vehicle ahead to a predetermined target following distance, wherein the target following distance is predetermined as a function of an activated operating mode of the distance control system, comprising:
- performing a plausibility check by checking whether V2X data is exchanged or can be exchanged between the vehicle ahead and the subject vehicle over a V2X connection;
- activating, based on a determination that no V2X data is exchanged or can be exchanged between the vehicle ahead and the subject vehicle over the V2X connection, a first operating mode in which a first target following distance is predetermined as a function of a reaction time of a driver of the subject vehicle,
- activating, based on a determination that V2X data is exchanged or can be exchanged between the vehicle ahead and the subject vehicle over the V2X connection, a second operating mode in which a second target following distance is predetermined independently of the reaction time of the driver of the subject vehicle,
- wherein the first target following distance is compared with the second target following distance and/or the reaction time of the driver of the subject vehicle is compared with a latency time indicating the time for transmitting the V2X data between the subject vehicle and the vehicle ahead via the V2X connection, and
- wherein the second operating mode is activated based on a determination that the second target following distance is set equal to the first target following distance or wherein the first operating mode is activated automatically based on a determination that the second target following distance is longer than the first target following distance and/or the latency time is longer than the reaction time of the driver of the vehicle.

2. The method as claimed in claim 1, comprising:
- checking whether the vehicle ahead is in a same lane as the subject vehicle by comparing a global vehicle ahead position with a global subject vehicle position, wherein the global vehicle ahead position is derived from the V2X data transmitted via the V2X connection; and
- activating, the second operating mode based on a determination that the vehicle ahead is in the same lane as the subject vehicle.

3. The method as claimed in claim 1, wherein the plausibility check further comprises checking whether the actual following distance between the subject vehicle and the vehicle ahead remains approximately the same, and wherein the second operating mode is activated if based on a determination that the actual following distance between the subject vehicle and the vehicle ahead remains approximately the same.

4. The method as claimed in claim 1, wherein the plausibility check further comprises checking whether the vehicle ahead is in a field of view of a camera of the subject vehicle and recognizing whether the vehicle ahead is in the same lane as the subject vehicle on the basis of camera data of the camera, and wherein the second operating mode is activated based on a determination that if the vehicle ahead is in the same lane as the subject vehicle on the basis of camera data of the camera.

5. The method as claimed in claim 4, wherein the plausibility check further comprises checking whether driving dynamics information, including a vehicle ahead target deceleration and/or an actual vehicle ahead speed, matches the camera data output by the camera, and/or checking whether the actual following distance determined by the distance control system can be derived from camera data output by the camera, and wherein the second operating mode is activated based on a determination that the driving dynamics information matches the camera data output by the camera and/or based on a determination that the actual following distance determined by the distance control system can be derived from the camera data.

6. The method according to claim 1, wherein the plausibility check for activating the second operating mode is carried out over a plausibility check period.

7. The method as claimed in claim 1, wherein the plausibility check further comprises establishing that the subject vehicle and the vehicle ahead intend to drive in a convoy mode with the actual following distance relative to each other without taking into account the reaction time of the driver of the subject vehicle.

8. The method as claimed in claim 1, wherein the reaction time of the driver of the subject vehicle is between 0.8 s and 1.5 s.

9. The method as claimed in claim 1, wherein:
- the first target following distance follows from a first minimum safety distance which takes into account at least one reaction distance, and
- the second target following distance follows from a second minimum safety distance, which takes into account at least one latency distance and does not take into account the at least one reaction distance,
- the at least one reaction distance is determined from the reaction time of the driver of the subject vehicle, taking into account a current subject vehicle actual speed, and
- the at least one latency distance is determined at least from a plausibility time, taking into account the current actual vehicle speed, wherein the latency time indicates the time for transmitting the V2X data between the subject vehicle and the vehicle ahead via the V2X connection.

10. The method as claimed in claim 9, wherein the first and second minimum safety distance further take into account a braking safety distance, wherein the braking safety distance follows from a braking capacity of each of the vehicle ahead and the subject vehicle.

11. The method as claimed in claim 9, wherein:
- the first target following distance also follows from a sum of the first minimum safety distance, at least taking into account the reaction distance, and an additional distance selected by the driver; and
- the second target following distance also follows from a sum of the second minimum safety distance, at least taking into account the at least one latency distance and not taking into account the reaction distance, and the additional distance selected by the driver.

12. The method as claimed in claim 1, further comprising:
- determining whether the second target following distance is greater than the first target following distance and/or the latency time is greater than the reaction time of the driver of the subject vehicle; and
- warning the driver with a visual, acoustic, and/or haptic warning based on a determination that the second target following distance is greater than the first target following distance and/or the latency time is greater than the reaction time of the driver of the subject vehicle.

13. The method as claimed in claim 1, further comprising:
- activating an activation device to permit the plausibility check, wherein the activation device is a switch arranged in the subject vehicle which can be temporarily or permanently activated by the driver.

14. The method as claimed in claim 13, wherein the first operating mode is automatically activated or maintained based on the activation device being deactivated.

15. The method as claimed in claim 1, further comprising deactivating the second operating mode based on the driver operating a brake pedal and/or an accelerator pedal.

16. The method as claimed in claim 15, further comprising deactivating the distance control system or activating the first operating mode if based on the driver deactivating the second operating mode.

17. The method as claimed in claim 1, further comprising determining, the actual following distance between the vehicle ahead and the subject vehicle from environment signals of a radar sensor and/or a lidar sensor in the subject vehicle.

18. A distance control device in a subject vehicle for carrying out a method for controlling a subject vehicle with a braking system, a drive system and a distance control system, wherein the distance control system is configured to control an actual following distance between the subject vehicle and a vehicle ahead to a predetermined target following distance, wherein the target following distance is predetermined as a function of an activated operating mode of the distance control system, the method comprising:
  performing a plausibility check by checking whether V2X data is exchanged or can be exchanged between the vehicle ahead and the subject vehicle over a V2X connection,
  activating, based on a determination that no V2X data is exchanged or can be exchanged between the vehicle ahead and the subject vehicle over the V2X connection, a first operating mode in which a first target following distance is predetermined as a function of a reaction time of a driver of the subject vehicle,
  activating, based on a determination that V2X data is exchanged or can be exchanged between the vehicle ahead and the subject vehicle over the V2X connection, a second operating mode in which a second target following distance is predetermined independently of the reaction time of the driver of the subject vehicle, wherein:
    the first target following distance is compared with the second target following distance and/or the reaction time of the driver of the subject vehicle is compared with a latency time indicating the time for transmitting the V2X data between the subject vehicle and the vehicle ahead via the V2X connection,
    the second operating mode is activated based on a determination that the second target following distance is set equal to the first target following distance or wherein the first operating mode is activated automatically based on a determination that the second target following distance is longer than the first target following distance and/or the latency time is longer than the reaction time of the driver of the vehicle, and
    the distance control device is configured to control the actual following distance between the subject vehicle and the vehicle ahead to the target following distance, wherein the target following distance can be predetermined as a function of an operating mode of the distance control system which can be activated by the distance control device, wherein
    in the first operating mode, which can be activated by the distance control device, the first target following distance can be predetermined as a function of the reaction time of the driver of the subject vehicle,
    in a second operating mode which can be activated by the distance control device, a second target following distance can be predetermined independently of the reaction time of the driver of the subject vehicle,
    the second operating mode is activated by the distance control device based on the plausibility check as to whether V2X data is exchanged or can be exchanged between the vehicle ahead and the subject vehicle via the V2X connection.

19. A subject vehicle with a distance control system having a distance control device as claimed in claim 18.

* * * * *